United States Patent [19]
McClure et al.

[11] Patent Number: 5,933,999
[45] Date of Patent: Aug. 10, 1999

[54] GUN REST

[76] Inventors: John H. McClure; Mary Anne McClure, both of 7170 Plainview Rd., Hillsboro, Ohio 45133

[21] Appl. No.: 09/135,425

[22] Filed: Aug. 17, 1998

Related U.S. Application Data

[60] Provisional application No. 60/092,235, Jul. 9, 1998.

[51] Int. Cl.$^6$ .................................................. F41A 27/30
[52] U.S. Cl. ................................................................ 42/94
[58] Field of Search ................................. 42/94; 89/37.04

[56] References Cited

U.S. PATENT DOCUMENTS

| | | | |
|---|---|---|---|
| D. 203,680 | 2/1966 | Allison | 42/94 |
| 499,315 | 6/1893 | Borchardt | 42/94 |
| 1,618,966 | 2/1927 | Bull | 42/94 |
| 2,870,683 | 1/1959 | Wilson | 42/94 |
| 3,016,802 | 1/1962 | Grunenberg | 42/94 |
| 3,225,656 | 12/1965 | Flaherty et al. | 42/94 |
| 4,937,965 | 7/1990 | Narvaez | 42/94 |
| 4,967,497 | 11/1990 | Yakscoe | 42/94 |
| 5,018,294 | 5/1991 | McGuffee | 42/94 |
| 5,347,740 | 8/1994 | Rather et al. | 42/94 |
| 5,644,862 | 7/1997 | Folmer | 42/94 |
| 5,715,624 | 2/1998 | Helbelink | 42/94 |
| 5,815,974 | 10/1998 | Keng | 42/94 |

FOREIGN PATENT DOCUMENTS

| | | | |
|---|---|---|---|
| 505453 | 5/1920 | France | 42/94 |

*Primary Examiner*—Charles T. Jordan
*Assistant Examiner*—Denise J. Buckley

[57] ABSTRACT

A gun rest is described that includes an arcuate elongate rocker member having a first substantially U-shaped bracket at one end thereof for supporting the barrel of the firearm and a second substantially U-shaped bracket at the other end for supporting the firearm forward of the trigger or receiver thereof, the rocker member being pivotally attached to a yoke and rotatably mounted on a vertical support member having structure thereon for attachment to a vehicle or otherwise anchored at a selected other location.

10 Claims, 1 Drawing Sheet

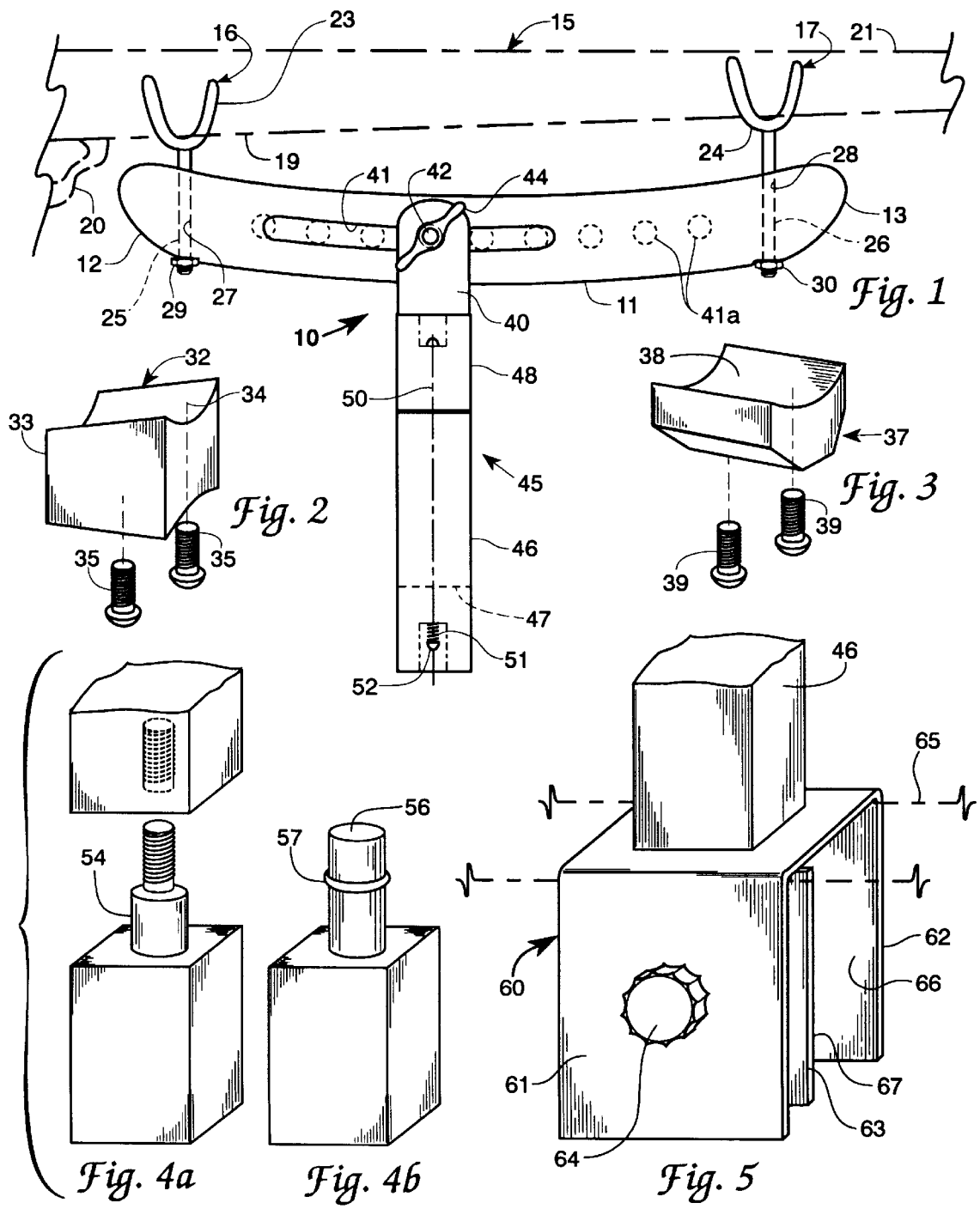

GUN REST

REFERENCE TO PRIOR RELATED APPLICATION

This application claims the benefit of the prior Provisional Application filed Jul. 9, 1998, and assigned Ser. No. 60/092,235.

BACKGROUND OF THE INVENTION

1. Field of the Invention

The invention relates generally to firearm supports for assisting a shooter in steadying the firearm during firing, and more particularly to a new and improved adjustable rest for rifles, shotguns, pistols and the like, the gun rest being especially well balanced in supporting a firearm, and configured preferably for mounting on the bed of a pickup truck.

2. Description of Related Prior Art

Gun rests in various configurations have found substantial and varied use in the prior art, such as for steadying a firearm for target practice, in sporting events which include shooting as an element of the events, for hunting game or for exterminating pests, or other applications in which steadying the firearm is essential in order to obtain the greatest possible accuracy of results. The greatest accuracy is achieved in the absence of any body movements on the part of the shooter affecting movement of the firearm.

Various configurations for gun rests have be proposed in the prior art for eliminating inadvertent movement of the firearm by the shooter as a factor in the accuracy of the firing. Representative prior art gun rest structures and substantial background information related thereto may be found by reference to U.S. Pat. No. 5,666,757 to Helmstadter, which describes a pistol and rifle rest including a movable crosspiece member with a cradle member at each end thereof for supporting the barrel at one end and the butt stock of the firearm at the other, the crosspiece member supported on a vertical pointed rod with a foot accommodating member for pressing into the gound; to U.S. Pat. No. 5,233,779 to Shaw, which describes a rifle rest including a pair of particulate filled superimposed bags interconnected by a connecting hinge means therebetween; to U.S. Pat. No. 5,067,268 to Ransom, which describes a rifle rest including a rifle supporting cradle member supported by a tripod base having a finely adjustable screw type on each leg thereof and means for selectively positioning and locking the cradle member in a horizontal plane; to U.S. Pat. No. 4,987,694 to Lombardo, which describes a two strap harness arrangement for holding the buttstock of a firearm, supported on a vertical shaft and base, and a dampening pad on the rear of the gun rest providing protection from recoil of the firearm; to U.S. Pat. No. 4,937,965 to Narvaez, which describes a horizontal support structure for a long gun supported on the forward end of a horizontal arm rest portion of a chair; to U.S. Pat. No. 4,876,814 to Lombardo, which describes a gun rest having an attaching bracket shaped for securing and supporting the buttstock of a firearm, the bracket being pivotally connected to a vertical slide, and a recoil pad on the rear of the gun rest; to U.S. Pat. No. 4,007,554 to Helmstadter, which includes an adjustable two point cradle member for carrying the entire weight of the firearm; and to the references cited in the foregoing cited patents.

The prior art gun rests suffer from certain shortcomings that render their use undesirable in certain critical shooting situations. For example, the prior art gun rests may provide two point support for a substantial length of the firearm with one support point on the buttstock and the other near the end of the barrel, which may provide stable support for the firearm without assistance of the shooter, but such an arrangement requires the shooter to grasp the firearm at two places between the support points of the gun rest for firing (i.e., at the barrel stock or forearm with one hand and at the trigger with the other hand), interferes with good balance of the firearm during firing and may require the shooter to assume an awkward position during firing of the firearm and limit the shooter's ability to conveniently elevate the firearm or to move the firearm in a horizontal plane in order to visually acquire and fire at a target. The two point support in certain prior art gun rests include means to hold the firearm firmly in place, which may also be undesirable in many shooting situations.

The invention, described in certain representative embodiments in the following detailed description and accompanying drawings, overcomes the foregoing shortcomings and other inadequacies in prior art gun rest structures, by providing a new and useful gun rest for supporting a firearm during firing, which includes an arcuately shaped rocker member having substantially U-shaped support brackets at each end thereof for supporting the firearm at a first point near the end of the barrel and at a second point intermediate the barrel and buttstock forward of the receiver or trigger of the firearm, which arrangement requires the shooter to grasp the firearm at only one point between the support brackets (namely, the forearm), and thereby provides optimum balance of the firearm as held by the shooter during visual acquisition of the target and firing of the firearm.

BRIEF SUMMARY OF THE INVENTION

It is a principal object of the invention to provide a new and improved gun rest for firearms for improving the shooting accuracy of a shooter.

It is another object of the invention to provide a stable gun rest for rifles and shotguns.

It is another object of the invention to provide a gun rest which is provides a substantially balanced feel of a firearm for the shooter in aiming and firing the firearm supported on the gun rest.

It is another object of the invention to provide a gun rest which is characterized by its rugged, lightweight and portable structure, quick assembly and ease of use in allowing a shooter to quickly and easily visually acquire a target.

It is yet another object of the invention to provide a gun rest for mounting on the sidewalls or tail gate of a pickup truck.

It is yet another object of the invention to provide a gun rest that can be used by either a right hand or left hand shooter.

Further objects and advantages of the invention will become apparent from the following written description of various and preferred embodiments thereof read together with the accompanying drawings.

In accordance with the principles and objects of the invention as just stated, a new and improved gun rest is provided that includes an arcuate elongate rocker member having a first substantially U-shaped bracket at one end thereof for supporting the barrel of the firearm and a second substantially U-shaped bracket at the other end for supporting the firearm forward of the trigger or receiver thereof, the rocker member being pivotally attached to a yoke and rotatably mounted on a vertical support member having means thereon for attachment to a vehicle, such as the sidewall or tailgate of the bed of a pickup truck, or anchored at a selected other location.

DESCRIPTION OF THE DRAWINGS

The novel aspects of the invention will be best appreciated from the following written description when read together with the accompanying drawings in which:

FIG. 1 is a view in elevation of a representative gun rest of the invention according to one embodiment of the invention.

FIG. 2 is a perspective view of an alternate support bracket structure for the representative embodiment of the invention shown in FIG. 1.

FIG. 3 is a perspective view of another alternate support bracket structure for the representative embodiment of the invention shown in FIG. 1.

FIGS. 4a and 4b show representative rotatable vertical support structures for the invention.

FIG. 5 shows a representative clamp structure for removably mounting the gun rest of the invention to the sidewall or tailgate of the bed of a pickup truck.

DETAILED DESCRIPTION OF THE INVENTION

In the drawings, FIG. 1 shows a view in elevation of one representative embodiment of gun rest 10 of the invention. As suggested by the representative structure of the invention as depicted in FIG. 1, gun rest 10 may preferably include a generally arcuate shaped rocker member 11 having first and second ends 12 and 13 providing direct support for a rifle, shotgun or other firearm 15 (shown by schematic dashed lines). Near ends 12 and 13 of rocker member 11 are attached first and second U-shaped support brackets 16 and 17 on which firearm 15 is supported in a firing position utilizing gun rest 10. In accordance with a feature of the invention and as illustrated in FIG. 1, bracket 16 preferably supports firearm 15 at a point intermediate the barrel and the rear butt portion of firearm 15 near the receiver 19 and forward of the trigger guard 20 thereof, and bracket 17 supports firearm 15 near the end of the barrel 21 thereof firearm in order to provide two-point support for the firearm during firing. It is noted that rocker member 11 may be preferably be sized in length to comfortably receive the firearm as just described at one point near the barrel sight and at a second point near the receiver of the firearm at the other end 12 of member 11. Accordingly, member 11 may preferably be sized in length from about 18 inches to about 36 inches and in thickness up to about two inches, the specific dimensions of rocker member 11, however, are not considered limiting of the invention. Member 11 is also preferably bowed just sufficiently to allow a shooter to conveniently grasp firearm 15 with the hand intermediate support brackets 16 and 17.

As may be noted by one with skill in the applicable art guided by these teachings, in a less preferable structure of gun rest 10 of the invention, only the bracket 17 supporting barrel 21 may be included.

As suggested in FIG. 1, U-shaped support brackets 16 and 17 may take the form of U members 23 and 24 having attached threaded rods 25 and 26 for insertion into holes 27 and 28 in rocker member 11 and secured by nuts 29 and 30. Brackets 16 and 17 may be coated with any suitable material to prevent scratching or marring of the contacting surfaces of firearm 15. With reference now to FIGS. 2 and 3, shown therein are perspective views of alternate support bracket structures for gun rest 10. FIG. 2 shows alternate U-shaped bracket 32 in the form of a rubber block 33 having an upper surface 34 in the shape of a depression sized and shaped for receiving the barrel of the firearm. Block 32 is attached to member 11 by any suitable conventional attaching means such as screws 35, glue, nails or other means not considered limiting of the invention. A similarly shaped and attached second block 32 may be disposed near the other end of member 11 for supporting firearm 15 near the receiver thereof. Alternatively, in FIG. 3 is shown another bracket structure in the form of block 37 having a suitably shaped depression 38 on the upper surface thereof, similar to bracket 32, and may be attached to rocker member 11 by screws 39 or the like inserted through appropriately placed holes (not shown) in member 11. It is noted that blocks 32 or 37 may comprise rubber, wood, metal or plastic or other suitable material, as would occur to the skilled artisan practicing the invention, and may also be coated with any suitable material to prevent marring or scratching of the firearm 15 surfaces, the specific material or materials of construction selected for use not considered limiting of the invention.

Referring again to FIG. 1, in the preferred embodiment represented by gun rest 10, rocker member 11 is pivotally mounted within a suitably sized yoke 40 whereby a shooter may selectively rotate firearm 15 about a first axis in order to elevate firearm 15 in a generally vertical plane in visually acquiring and firing at a target. Accordingly, rocker member 11 has defined therethrough elongate slot or aperture 41 for receiving a transversely disposed bolt 42 inserted through yoke 40 and releaseably secured at a selected location along slot 41 by wingnut 44, threaded knob or other suitable securing means. It is noted that in an alternative embodiment, slot 41 may be replaced by a plurality of appropriately sized holes (represented in phantom at 41a) spaced along member 11 for receiving bolt 42. Yoke 40 is preferably sized to snugly receive rocker member 11 as suggested in FIG. 1 so that in the assembled condition, rocker member 11 exhibits mild resistance to pivoting in the vertical plane with firearm disposed on rocker member 11 in a position for firing. Rocker member 11 may thereby be selectively positioned on yoke for accommodating firearm 15 and the shooter in providing optimum balance to firearm 15 during target acquisition and firing.

Rocker member 11 and yoke 40 are structured such that in the assembled condition as suggested in FIG. 1, rocker member 11 with firearm 15 disposed thereon may be selectively rotated about a generally vertical axis in a generally horizontal plane. Accordingly, yoke 40 is attached to rotatable vertical support structure 45 which, in non-limiting configuration suggested in the drawings may comprise a first (relatively fixed) portion 46 sized in cross section to be snugly received by one of the openings provided in the side walls of the bed of a pickup truck. The lower end of portion 46 may include a short axial slot 47 (shown hidden in FIG. 1) to provide sufficient resiliency to that end of portion 46 and a snug fit within the side wall opening of the pickup bed and thereby frictionally resist removal therefrom. Rotatable second portion 48 is axially aligned with and rotatably attached to first portion 46 at a first (lower) end thereof and has the yoke 40 structure attached to the other (upper) end as suggested in FIG. 1. Portion 48, in combination with portion 46, is sized in length to accommodate a desirable and comfortable height for the shooter in resting firearm 15 in a firing position on gun rest 10 as mounted on a pickup truck or otherwise disposed by the shooter for target acquisition and firing in manner as would occur to the skilled artisan practicing the invention.

Referring now to FIGS. 4a and 4b together with FIG. 1, rotatable portion 48 of support 45 may be rotatably mounted to fixed portion 46 by any suitable means. For example, an axially extending threaded rod 50 biased by spring 51 may be disposed axially within rotatable portion 48 and fixed portion 46 and resiliently held at the respective ends thereof with threaded nuts 52 or the like, substantially as shown in FIG. 1. Alternatively, as shown in FIG. 4a, the rotatable structure may comprise a threaded peg 54 in one of portions 46 and 48 and a threaded hole in the other portion, or, as shown in FIG. 4b a peg 56 with an O-ring groove and an O-ring 57 thereon on one of portions 46 and 48 may be configured to be received by the other portion having a corresponding hole and annular O-ring groove (not shown).

It is further noted that some models of pickup trucks have no rack openings in the side walls of the bed. Accordingly, and in order to accommodate the attachment of gun rest 10 to such pickup truck bed sidewalls, to the tail gate of the pickup or to various appropriate locations on other vehicle types, the invention contemplates that lower portion 46 of rotatable support structure 45 may have attached thereto at the lower end thereof a clamp 60 structure as suggested in FIG. 5. Clamp 60 preferably includes confronting first and second wall members 61 and 62 of preselected spacing therebetween attached to the lower end of fixed portion 46 of support structure 45, and a movable wall member 63 adjustable in position between wall members 61 and 62 by way of screw means 64 for attachment or anchoring the gun rest at a desired location such as sidewall 65 (shown by phantom lines) or a tail gate of a pickup truck bed. It is noted that the clamp 60 structure as just described is best suited for attachment to a vertical member such as sidewall 65, but that attachment to a horizontal member (such as a lowered tail gate) may be accommodated by including in the portion 46 structure attached to clamp 60 a hinge structure (not shown). The inner wall surface 66 of wall member 62 and the confronting surface 67 of movable wall member 63 are preferably padded to avoid marring or scratching of the surfaces of any vertical or horizontal member to which clamp 60 is attached in the use of the invention for the purpose intended.

It is noted that the materials of construction for gun rest 10 may include wood, metal, plastic or other suitable material or combination of materials, material selection not being considered limiting of the invention herein. Further, as would be noted the gun rest as described is usable equally well by a left hand or right hand shooter.

The invention therefore provides a novel adjustable gun rest for firearms. It is understood that modifications to the invention may be made by those skilled in the art guided by these teachings within the scope of these teachings and the appended claims.

We claim:

1. A gun rest for a firearm, comprising:
   (a) a generally arcuate shaped elongate rocker member having first and second ends, said rocker member having an elongate slot defined through a thickness thereof along a preselected portion of a length thereof between said first and second ends;
   (b) a first substantially U-shaped bracket disposed near said first end of said rocker member and sized for supporting a barrel of a firearm, and a second substantially U-shaped bracket near said second end of said rocker member and sized for supporting the firearm in front of the trigger or receiver thereof, said rocker member sized in length to support the firearm at said first U-shaped bracket at the barrel of the firearm and at said second U-shaped bracket intermediate the barrel and trigger of the firearm;
   (c) a yoke disposed around and receiving and pivotally supporting said rocker member and a bolt transversely disposed through said yoke and said slot in said rocker member for releasably securing said rocker member within said yoke, whereby the firearm resting on said U-shaped brackets may be selectively elevated about a first axis defined through said bolt; and
   (d) a support member having first and second ends, said support member rotatably connected at said first end thereof to said yoke whereby said yoke and said rocker member may be rotated about a second axis defined through said support member.

2. The gun rest of claim 1 further comprising a clamp attached to said second end of said support member, said clamp consisting essentially of first and second confronting wall members of preselected spacing attached to said second end of said support member, a movable third wall member disposed between said first and second wall members, and screw means for selectively positioning said third wall member between said first and second wall members.

3. The gun rest of claim 1 wherein said rocker member is about 18 inches to 36 inches long.

4. The gun rest of claim 1 wherein said support member is sized in cross section at said second end thereof to be received by a rack opening in the side walls of the bed of a pickup truck.

5. The gun rest of claim 1 wherein said U-shaped support brackets comprise a material selected from the group consisting of rubber, wood, metal and plastic and said rocker member comprises a material selected from the group consisting of wood, metal and plastic.

6. A gun rest for a firearm, comprising:
   (a) a generally arcuate shaped elongate rocker member having first and second ends, said rocker member having a plurality of holes defined through the thickness thereof and spaced along a preselected portion of the length thereof between said first and second ends;
   (b) a first substantially U-shaped bracket disposed near said first end of said rocker member and sized for supporting the barrel of a firearm, and a second substantially U-shaped bracket near said second end of said rocker member and sized for supporting the firearm forward of the trigger or receiver thereof, said rocker member sized in length to support a firearm at said first U-shaped bracket at the barrel of the firearm and at said second U-shaped bracket intermediate the barrel and trigger of the firearm;
   (c) a yoke disposed around and receiving and pivotally supporting said rocker member and a bolt transversely disposed through said yoke and one of said plurality of holes in said rocker member for releasably securing said rocker member within said yoke, whereby the firearm resting on said U-shaped brackets may be selectively elevated about a first axis defined through said bolt; and
   (d) a support member having first and second ends, said support member rotatably connected at said first end thereof to said yoke whereby said yoke and said rocker member may be rotated about a second axis defined through said support member.

7. The gun rest of claim 6 further comprising a clamp attached to said second end of said vertical support member, said clamp consisting essentially of first and second confronting wall members of preselected spacing attached to said second end of said support member, a movable third wall member disposed between said first and second wall members, and screw means for selectively positioning said third wall member between said first and second wall members.

8. The gun rest of claim 6 wherein said rocker member is about 18 inches to 36 inches long.

9. The gun rest of claim 6 wherein said support member is sized in cross section at said second end thereof to be received by a rack opening in the side walls of the bed of a pickup truck.

10. The gun rest of claim 6 wherein said U-shaped support brackets comprise a material selected from the group consisting of rubber, wood, metal and plastic and said rocker member comprises a material selected from the group consisting of wood, metal and plastic.

* * * * *